United States Patent [19]

Alvarez et al.

[11] Patent Number: 5,535,324
[45] Date of Patent: Jul. 9, 1996

[54] METHOD AND SYSTEM FOR DRAGGING AND PLOTTING NEW DATA ONTO AN EMBEDDED GRAPH

[75] Inventors: Cesar Alvarez; Lisa R. James, both of Kirkland, Wash.

[73] Assignee: Microsoft Corporation, Redmond, Wash.

[21] Appl. No.: 310,644

[22] Filed: Sep. 22, 1994

[51] Int. Cl.$^6$ ........................................................ G06F 3/14
[52] U.S. Cl. ............................ 395/161; 395/147; 395/140
[58] Field of Search ...................................... 395/161, 155, 395/600, 147, 140; 345/100; 358/400; 382/109; 379/34

[56] References Cited

U.S. PATENT DOCUMENTS

| | | | |
|---|---|---|---|
| 5,301,315 | 4/1994 | Pellicano | 395/600 |
| 5,410,688 | 4/1995 | Williams et al. | 395/600 |
| 5,414,809 | 5/1995 | Hogan et al. | 395/155 |
| 5,414,838 | 5/1995 | Kolton et al. | 395/600 |
| 5,428,740 | 6/1995 | Wood et al. | 395/161 |

OTHER PUBLICATIONS

1992 Microsoft Excel 4.0 User's Guide, Book 1, Contents, Chapter 3 (What's new in version 4.0), Chapter 6 (Editing a worksheet), Chapter 11 (Creating a chart), Chapter 12 (Editing a chart) and Chapter 13 (Formatting a chart).

*Primary Examiner*—Raymond J. Bayerl
*Assistant Examiner*—Ruay Lian Ho
*Attorney, Agent, or Firm*—Jones & Askew

[57] ABSTRACT

A method and system is provided for selecting data contained in a computer's memory and displayed in cells on the computer's display screen in tabular form and graphically plotting the selected data onto another existing chart. The method and system include selecting the data contained in the computer's memory and displayed in tabular form on the computer's display screen to be incorporated into the other existing chart. The method and system or the present invention then integrate the selected data from the tabular chart into the other chart based upon the location and orientation of the data from the tabular chart.

12 Claims, 6 Drawing Sheets

FIG. 1(a)

|    | D       | E    | F    |
|----|---------|------|------|
| 20 |         | 1990 | 1991 |
| 21 | Widget1 | 30   | 40   |
| 22 | Widget2 | 45   | 56   |
| 23 | Widget3 | 23   | 45   |
| 24 | Widget4 | 78   | 79   |
| 25 | Widget5 | 34   | 36   |
| 26 | Widget6 | 56   | 59   |

FIG. 1(b)

|    | D       | E    | F    | G    |
|----|---------|------|------|------|
| 20 |         | 1990 | 1991 | 1992 |
| 21 | Widget1 | 30   | 40   | 50   |
| 22 | Widget2 | 45   | 56   | 67   |
| 23 | Widget3 | 23   | 45   | 67   |
| 24 | Widget4 | 78   | 79   | 80   |
| 25 | Widget5 | 34   | 36   | 38   |
| 26 | Widget6 | 56   | 59   | 62   |

FIG. 1(c)

|    | D       | E    | F    | G    |
|----|---------|------|------|------|
| 20 |         | 1990 | 1991 | 1992 |
| 21 | Widget1 | 30   | 40   | 50   |
| 22 | Widget2 | 45   | 56   | 67   |
| 23 | Widget3 | 23   | 45   | 67   |
| 24 | Widget4 | 78   | 79   | 80   |
| 25 | Widget5 | 34   | 36   | 38   |
| 26 | Widget6 | 56   | 59   | 62   |
| 27 | Widget7 | 67   | 68   | 69   |

FIG. 4A
|   | B | C | D | E |
|---|---|---|---|---|
| 5 |   | Qtr1 | Qtr2 | Qtr3 |
| 6 | FY93 | 1 | 3 | 5 |
| 7 | FY94 | 2 | 4 | 6 |
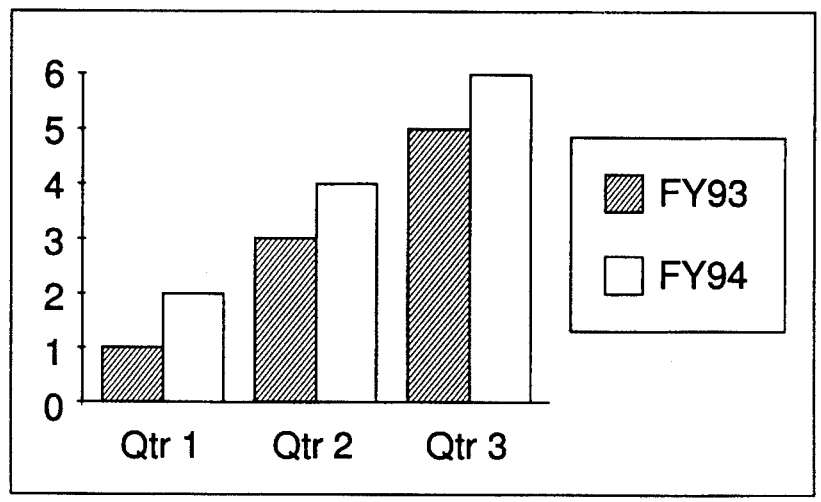
FIG. 4B
FIG. 5A
|   | H | I | J |
|---|---|---|---|
| 10 |   | FY93 | FY94 |
| 11 | Qtr1 | 1 | 2 |
| 12 | Qtr2 | 3 | 4 |
| 13 | Qtr3 | 5 | 6 |
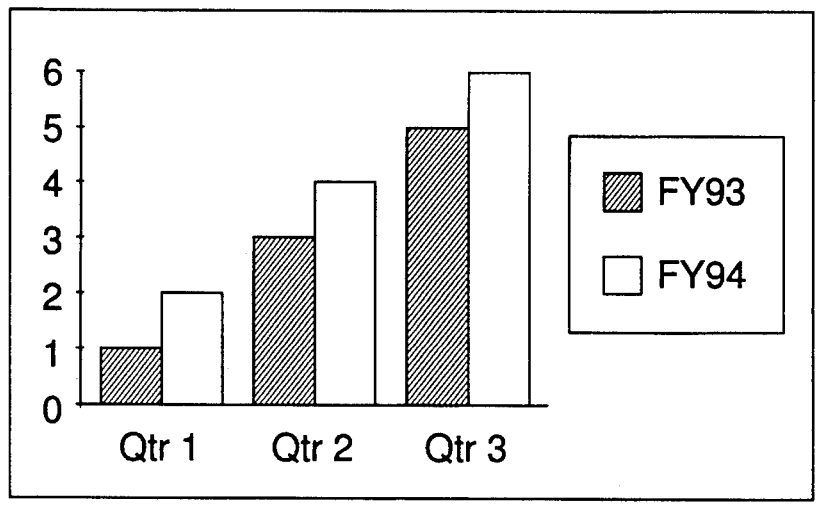
FIG. 5B

METHOD AND SYSTEM FOR DRAGGING AND PLOTTING NEW DATA ONTO AN EMBEDDED GRAPH

TECHNICAL FIELD

The present invention relates generally to transferring and transforming data in a data processing system and, more particularly, to dragging and plotting cells containing tabularized data onto another existing chart, such as an embedded bar chart, to add new data to the other existing chart.

BACKGROUND OF THE INVENTION

There are many computer application programs available which provide information processing tasks. Microsoft Excel, which is manufactured by Microsoft Corporation of Redmond, Wash., the assignee of the present invention, is one such application program that performs a variety of accounting and other information processing tasks. In application programs such as Microsoft Excel, a worksheet is typically used to store and manipulate data. One commonly used worksheet is called a spreadsheet. A spreadsheet is essentially a tabular two-dimensional grid with a finite number of columns and rows. The columns and rows of a spreadsheet intersect to form cells. The cells store data in tabular form which is displayed to the user on the spreadsheet.

Spreadsheet applications commonly allow a user to manipulate chosen data on the spreadsheet. However, in the past, adding data in tabular form to an existing graph or chart has always been a difficult process in many existing spreadsheet programs. If a user wanted to add a new data series to an existing chart or graph, that user would need to find the Edit/Series dialog in the application program and add a new data series by semi-selecting the data on the spreadsheet or the user would need to copy and paste the new data series onto the existing graph. Because using the Edit/Series dialing and the copy and paste procedures are typically complicated and understood by only experienced spreadsheet users, many users often recreate the chart or graph rather than execute the complicated procedures if a new data series needs to be added to a chart or graph.

Prior spreadsheet software provides a drag and drop process for adding data to an existing tabular chart. The drag and drop process simply allows a spreadsheet user to move various data on a spreadsheet to merge with other corresponding data. For instance, a new data series or data point may be added to a chart or graph by creating the single data series or data point, dragging it to the chart or graph, and dropping it on the chart or graph such that it becomes incorporated into the chart or graph.

Referring to the charts marked FIG. 1A–C, FIG. 1A is a tabular chart showing the sales of widgets 1–6 for years 1990 and 1991. If new data for these widgets is acquired or has been previously located in another area on the spreadsheet, for example data for year 1992, that particular column can be created or retrieved, dragged to the initial chart, FIG. 1A, and incorporated into the chart as shown in FIG. 1B. In a similar manner, it is possible to drag and drop data with respect to an additional widget, such as widget 7 as shown in FIG. 1C. Although the drag and drop process in prior spreadsheet software permits the user to add data without having to use the Edit/Series dialog or without having to copy and paste, both of which require the user to be familiar with a variety of functions, keys and edit commands, the drag and drop process does not provide a way to incorporate data from a tabular chart into a non-tabular chart, such as a bar-type chart. Although the drag and drop process can be useful to move existing data to combine with other existing data, the format of the combined data must directly correspond to the data with which it is being combined, i.e. tabularized data can only be combined with other tabularized data.

Therefore, there is a need in the art for a drag and plot process which is capable of allowing a spreadsheet user to drag tabularized data from a first tabularized chart to drop and incorporate that data onto another existing non-tabularized chart, such as a bar chart with bars generated which correspond to the dragged tabularized data.

SUMMARY OF THE INVENTION

The computing system and method of the present invention solve the problems with the prior art discussed above. Generally, the system and method of the present invention enable a spreadsheet user by means of a mouse or similar device to drag tabularized data from a first tabularized chart (source chart), for examples the charts shown in FIGS. 1 A–1C, and to drop and incorporate that data into a second existing non-tabularized chart (target chart), such as a bar chart, to produce bars corresponding to the dragged tabularized data.

More particularly described, the system and method of the present invention select new data contained in a computer's memory and displayed in cells forming a tabular chart (source chart) on the computer's display screen, and graphically plot the selected new data onto a second existing chart (target chart). The system and method select the new data displayed in the cells on the computer screen to be incorporated into the second existing chart. Thereafter, a bounding box quadrant of the data already existing on the tabular chart and the second existing chart is determined. The bounding box quadrant is defined by the outer cell boundaries that contain data which has already been incorporated in the source and target charts. A quadrant is simply a defined sector or area of the spread sheet on a display device. The quadrant in which the selected new data is displayed in the cells forming a tabular chart on the computer screen is then determined. Next, the system and method determine whether the bounding box quadrant with the existing data and the quadrant with the new data are the same or adjoining quadrants. The system and method of the present invention then integrate the new data displayed in the cells forming a tabular chart on the computer screen into the second chart if the data displayed in the cells is in the same or an adjoining quadrant to the bounding box quadrant.

Still more particularly described, if the tabular chart data is in row orientation, then the selected new data is charted on the second chart as new points in the same row if the selected data displayed in the cells is located in a horizontal adjoining quadrant to the bounding box quadrant. Row orientation is defined as when the series of data is in rows, as shown on the chart in FIGS. 4A and 4B. FIGS. 4A and 4B have a row orientation because, for example, all data for the series FY93 is located in row 6 of FIG. 4A. On the other hand, the selected new data is charted on the second chart in a new data series if the selected data displayed in the cells is in row orientation and the selected new data is located in a vertical adjoining quadrant to the bounding box quadrant.

Conversely, if the tabular chart data is in column orientation, then the selected new data is charted on the second chart as new points in the same column if the selected new data displayed in the cells is located in a vertical adjoining quadrant to the bounding box quadrant. Column orientation is defined as when the series of data is in columns as shown on the chart in FIGS. 5A and 5B. FIGS. 5A and 5B have a column orientation because, for example, all the data for FY93 is in column I. On the other hand, the selected new data is charted on the second chart in a new series if the selected new data displayed in the cells is in column orientation and the selected new data is located in a horizontal adjoining quadrant to the bounding box quadrant.

The system and method of the present invention queries the user to determine how to interpret the selected new data displayed in the cells if the selected new data is not completely within an adjoining quadrant to the bounding box quadrant or within the same row as existing data on the source chart and in the bounding box quadrant or an adjacent quadrant.

The system of the present invention includes a computer having a display device coupled via a basic input output system (BIOS) driver and the operating system in memory to a central processing unit (CPU) for displaying images. The system also includes a pointer control means, preferably a "mouse" device, coupled to the CPU for selectively positioning a pointer on the display device to select data displayed on the display device from the first chart to be incorporated into the second chart. The system also provides signal generation means, preferably provided by "clicking" the mouse device, to select data located under the pointer device on the first chart and to drag the selected data on the display so that it is physically over the second (or non-tabularized) chart. The system then provides means for integrating, by use of an application code, the selected new data into the second chart such that the selected new data takes the form of the data already contained in the second chart.

Therefore, it is an object of the present invention to provide a computing system and method for effectively and efficiently selecting new data from cells displayed on a computer's display screen in tabular chart form, and graphically plotting the selected data onto a second existing chart.

That the present invention accomplishes this object will be appreciated from the detailed description of the preferred embodiment to follow.

BRIEF DESCRIPTION OF THE DRAWINGS

FIGS. 1A–C are tabular charts which illustrate prior art spreadsheet applications.

FIGS. 4A and 4B are charts with the data orientation arranged in rows (row orientation).

FIGS. 5A and 5B are charts with the data orientation arranged in columns (column orientation).

DETAILED DESCRIPTION OF THE PREFERRED EMBODIMENT

Figure 2:
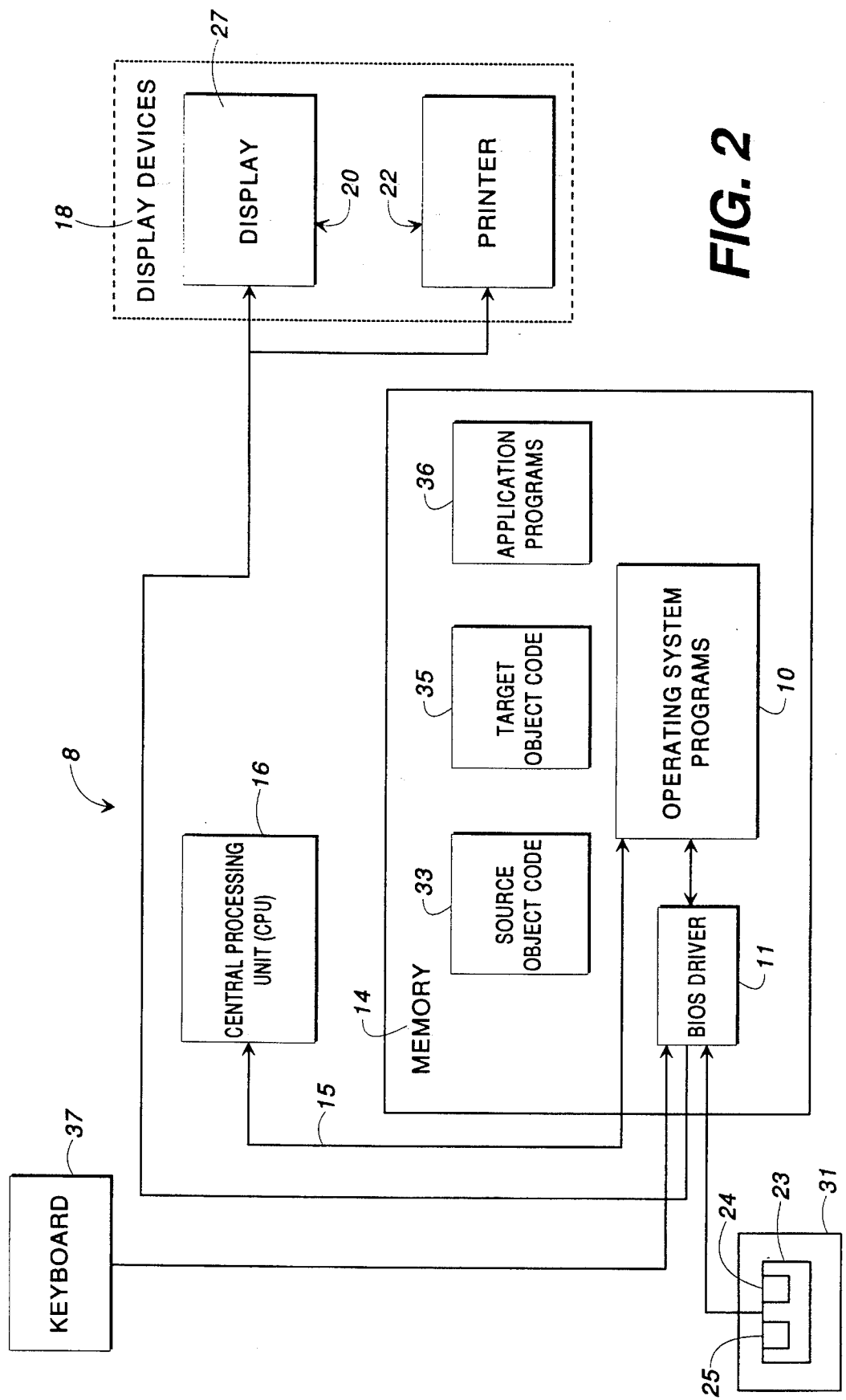
FIG. 2 is a block diagram which shows the preferred computer system which provides the operating environment of the present invention.

Turning next to the drawing figures in which like numerals reference like parts, the preferred embodiment of the present invention will now be described. The present invention is an advance over the prior art described with respect to FIG. 1 above because the present invention permits a spreadsheet user to create a new data series or data point on a second existing non-tabularized chart (target chart) from data dragged from a tabular chart (source chart). Although the description below illustrates the example of when the second existing chart is a bar-type chart, it will be appreciated by those skilled in the art that the second or target chart can be any type of non-tabularized chart commonly used in connection with computer software applications.

FIG. 2 shows a block diagram of the preferred operating environment, a computer system, for the preferred embodiment of the present invention. The present invention is based upon computer-implemented processes that can be embodied in one or more programs for a data processing system, such as a computer system, to carry out the methods and functions described herein. This computer-implemented process operates upon electrical or other physical signals to generate the desired physical results, namely the display of numbers, text and graphics based on the illumination of individual pixels for a pixel-oriented display device.

Turning now to FIG. 2, a computer system 8 runs an operating system 10. The operating system 10 can be stored within a memory 14 and operate with a central processing unit (CPU) 16. The operating system communicates with input and output devices, such as display devices 18, keyboard 37, and mouse 23, by means of basic input output system (BIOS) driver 11. The mouse 23 includes switches 24 and 25 for generating input signals to the operating system via the BIOS driver 11. The mouse 23 permits a user to select various command modes, modify graphic data, and input other data utilizing switches 24 and 25. More particularly, the mouse 23 permits a user to selectively position a cursor or pointer 27, located on the display 20, at any desired position on the display 20 by movement of the mouse 23 over a surface 31. The mouse 23 utilizes a well known system and method for moving the cursor 27 on the display 20 by movement of the mouse 23 over surface 31. Although the mouse 23 described above is preferably used with the present invention, it will be appreciated by those skilled in the art that a variety of well known pointer control devices may be utilized by the present invention, such as mechanical mice, track balls, and joy sticks.

The memory 14, which is connected to the CPU 16 via a bi-directional signal path or bus 15, may be implemented as a volatile memory storage device, such as random access memory (RAM), or nonvolatile memory storage device, such as a fixed disk, read only memory (ROM), or a flexible disk, or a combination of both memory components. For example, the operating system for a general purpose computer system is typically stored within nonvolatile memory and, upon boot, the operating system is allocated a portion of volatile memory to directly support computer operations. Thus, the operating system 10 can be stored in a permanent manner within nonvolatile memory. The memory 14 typically contains at least three separate codes for any drag and plot operation; namely, code for a source object 33, code for a target object 35, and code for an operating system 10.

The present invention is especially well adapted for use in an object-oriented programming environment. Therefore, in the preferred embodiment of the present invention, the code for the operating system 10 provides an object-oriented programming environment. The targets and sources of drag and plot operations are implemented as "objects." An object is a combination of data members (i.e., attributes held in data structures) and member functions that act upon the data members. Those skilled in the art will appreciate, however, that the present invention need not be implemented in the object-oriented programming environment.

The CPU 16 is typically implemented as a microprocessor, such as the models 80386 or 80486 that are available from Intel Corporation, Santa Clara, Calif. The CPU 16 operates in combination with computer software, such as the operating system 10 and other application programs 36 stored in memory 14, to control the operations of the computer system 8. To simplify the representation of the known architecture of a general purpose computer system, conventional computer components, including computer resources such as a direct memory access controller and an interrupt controller, as well as video and printer adapter devices, are not shown. However, it will be appreciated that the CPU 16 is connected to and supported by conventional computer components via one or more system busses that support communications of control, address, and data signals between the CPU 16 and these standard computer components. It will also be appreciated that additional devices may be coupled to the computer 8 for storing data such as magnetic tape drives, bubble memory devices, as well as methods which are in turn coupled to other data processing systems.

The display devices 18 include a display 20 and a printer 22, which represent typical pixel-oriented display devices. The display 20 can be implemented as a CRT display or an LCD display, and the printer 22 can be implemented as a dot matrix printer or a laser printer. Those skilled in the art will appreciate that the display 20 and the printer 22 are two examples of pixel-oriented display devices and that other such devices may be used with an embodiment of the present invention.

The drag and plot operations and methods as described herein are typically performed by a user with the mouse 23. It is also possible to implement the present invention by using a keyboard 37. The preferred mouse for implementation of the present invention is a two-button mouse as shown in FIG. 2. With a two-button mouse as in FIG. 2, it is assumed that the left mouse button 25 is the primary mouse button. A roller ball is attached to the bottom side of the mouse to generate directional commands as the mouse 23 rolls across the flat surface 31. As described above, the movement of the roller ball is translated into movement of the cursor 27 on the display 20.

The method of the present invention is physically accomplished by the user with use of the mouse 23. Initially when dragging and plotting data according to the present invention, the user moves the mouse 23 so that the cursor 27 on the display 20 is situated over a given source object, preferably a tabular chart. Typically, the user depresses a mouse button, usually with the left button 25 of the two-button mouse with the source object (tabularized data) to be plotted under the cursor 27 on the display 20. In operation, a user will have to move the mouse 23 while the left button 25 remains depressed if the source object is contained in more than one grid box of the spreadsheet. After all of the source object has been selected, the user then releases the left button 25 on the mouse and moves the cursor 27 to a position over any border of the selected source object. When the cursor is over any such border, the user again depresses the left button 25 on the mouse 23. While keeping the left mouse button 25 depressed, the user drags the source object over on the display 20 to the target object, for example an existing embedded bar chart. "Drag" means to hold the left mouse button 25 down while you move the mouse 23 and the corresponding source object. The user then releases the depressed button on the mouse over the target object and the tabularized source object is converted to bar chart data and incorporated into the existing bar chart in this example.

Figure 3:
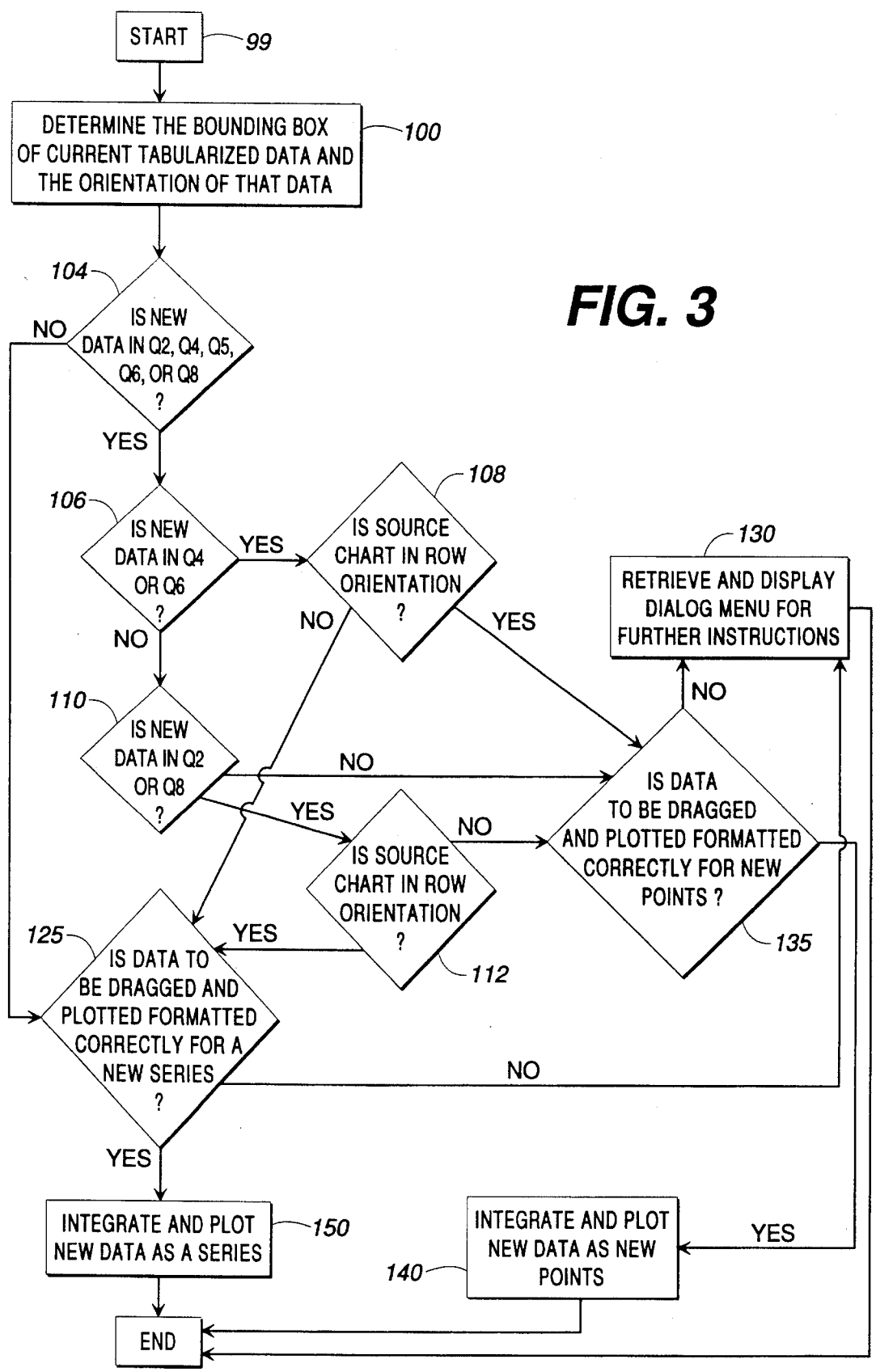
FIG. 3 is a flow chart which generally sets forth the method of the preferred embodiment.

FIG. 3 generally sets forth the method of the present invention. Although FIG. 3 uses quadrant locations which are specific to quadrants shown in FIG. 6, those skilled in the art will recognize that the method as shown in FIG. 3 can be applied with many other quadrant configurations. Initially, the method starts at step 99 and proceeds to step 100. At step 100, the method determines in which bounding box the current tabularized data is located and the orientation of that data. The bounding box is defined by the outer cell boundaries of the tabularized data as displayed on the display 20. The bounding box should include all data which has previously been incorporated into both the source and target charts. For example in FIG. 6, the bounding box is B5 E7. This current tabularized data has already been incorporated into the existing bar chart (or target). The bounding box B5: E7 in this example does not include the data which will be dragged and plotted onto the existing bar chart. In order to define a bounding box, the tabularized data is arranged in columns and rows which are defined by the code for the operating system 10. For purposes of the discussion of the present invention, the rows have been assigned numbers and the columns have been assigned letters. However, it will be appreciated by those skilled in the art that the bounding box may be defined in many different ways or variations. As described herein, data orientation is defined as whether the tabularized data is arranged by rows or columns. For instance, FIGS. 4A and B contain charts with data orientation in rows (row orientation) and a bounding box of B5:E7 while FIGS. 5A and B contain charts with data orientation arranged in columns (column orientation) and a bounding box of H10:J13. It is necessary to determine the bounding box and data orientation so that the new tabularized data will be interpreted correctly when it is later dragged to and integrated into an existing embedded bar chart.

Figures 6, 7:
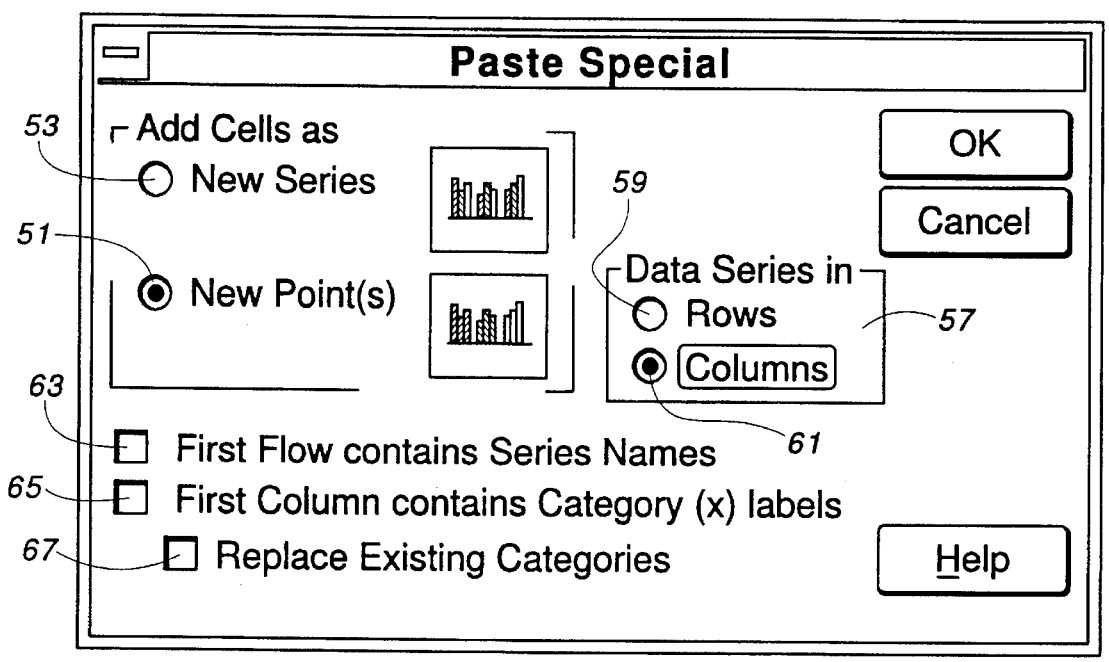
FIG. 6 is a tabular chart showing the surrounding quadrants.
FIG. 7 is a model of the dialog menu.

After determining the bounding box and data orientation at step 100 (FIG. 3), step 104 of the method then determines if the new data (the data to be dragged) to be added to the bar chart is in quadrants 2, 4, 5, 6, or 8 (Q2, Q4, Q5, Q6, or Q8, respectively). In other words, step 104 determines whether the data being dragged onto the target chart is located in the bounding box quadrant or in a quadrant which is directly adjacent to the bounding box quadrant. For purposes of the discussion of the present invention, a quadrant is simply a defined sector or area on a display 20 as shown in FIG. 6. The quadrant limits and boundaries are preferably defined by the code for the application program 36.

If the tabularized data to be dragged is not in either Q2, Q4, Q5, Q6, or Q8, then the data is interpreted as a series and the analysis proceeds to step 125 of FIG. 3. If the tabularized data to be dragged is located in either Q2, Q4, Q5, Q6, or Q8, the method of the present invention next determines whether the data is located in Q4 or Q6 (step 106, FIG. 3). If the data to be dragged is in either Q4 or Q6, it is next determined, at step 108, whether the source chart is in row orientation. If the source chart is in row orientation, the data to be dragged is interpreted as new points and the method of the present invention proceeds to step 135. If the source chart is in column orientation and the data to be dragged is in Q4 or Q6, then the data is interpreted as a new series and the method of the present invention proceeds to step 25.

If it is determined that the data to be dragged is in either Q2, Q5, or Q8 (i.e., the "no" branch from step 106), it is determined if the data to be dragged is in Q2 or Q8 (step 110, FIG. 3). If the data is not in Q2 or Q8, then the data is in Q5 and is interpreted as points, thus the method proceeds to step 135. If the data to be dragged is in Q2 or Q8, the method of the present invention determines whether the source chart is in row orientation (step 112, FIG. 3). If the source chart is in row orientation, the data to be dragged is interpreted as a new series and the analysis proceeds to step 125 of FIG. 3. If the source chart is not in row orientation, the data to be dragged is interpreted as new points and the analysis proceeds to step 135 of FIG. 3.

Thereafter, it is determined if the data to be dragged is properly formatted in step 125 for a new series of data and in step 135 for new points in a series. If either a new series of data or new points of data to be dragged are not formatted correctly, as described below, then the dialog menu is retrieved to query the user as to how the data should be interpreted (steps 125, 135 and 130, FIG. 3). If the data is formatted correctly, then the dragged data is integrated into the target chart (steps 140 and 150, FIG. 3).

As an example of the method as shown in FIG. 3, if the data to be dragged onto the bar chart from the tabularized chart is stored in either Q4 or Q6, as shown in FIG. 6, the method of the present invention assumes that the data is new data points for the series in the same row. In other words, the tabularized data will be assumed to be newly added points related to an already existing series of points. For instance, if cells F5: F7 were dragged onto an existing bar chart, the method of the present invention would assume that the data contained in cell F5 is a category label (Qtr 4 for example) because cell F5 is in the same row as the other existing category labels (Qtr 1, Qtr 2, and Qtr 3). The data contained in cells F6 and F7 would be added to each series as new data points. In FIG. 6, the data in cell F6 would be added to the FY 93 series and the data in cell F7 would be added to the FY 94 series.

On the other hand, for FIG. 6, if the data to be dragged onto the existing bar chart is in either Q2 or Q8, it is assumed that the data forms a new series for the bar chart. The method of the present invention requires that the data in FIG. 6 from Q2 or Q8 must start either in column B if the series has a title, such as the titles FY 93 and FY 94 already in column B, or in column C if it does not have a title. If the data to be dragged and plotted is in Q2 or Q8 and is not formatted as described above, then the dialog menu, as described below, is brought up on the display 20 for the user to input how the dragged data will be interpreted and plotted on the bar graph.

The dialog menu as shown in FIG. 7 allows the user to provide the appropriate interpretation for the data to be added if needed. This dialog menu is one which is known in the art and has been used on a typical Edit or Paste routine in previous editions of Microsoft Excel software. Choices can be made on the dialog menu by moving the mouse 23 such that the cursor 27 is over a particular choice, and "clicking" the left mouse button 25 while over the item to be chosen.

Referring to FIG. 7, New Points 51 allows for new points to be added while New Series 53 allows for a new series to be added to an existing bar chart. If a data series is being added, it is necessary to indicate in box 57 whether the data series being added is in rows 59 or columns 61. The Data Series box 52 defaults to whatever the current series orientation is in the process. The First Row Contains Series Names box 63 is used if a series is being added to the graph and the name of the added series is in the first row position of the series. Likewise, the First Column Contains Category [X] Labels box 65 is used if a column of data being added contains a category label or heading. The Replace Existing Categories box 67 is used if the user wants the new data to replace the current category labels in the existing chart.

Figure 8:
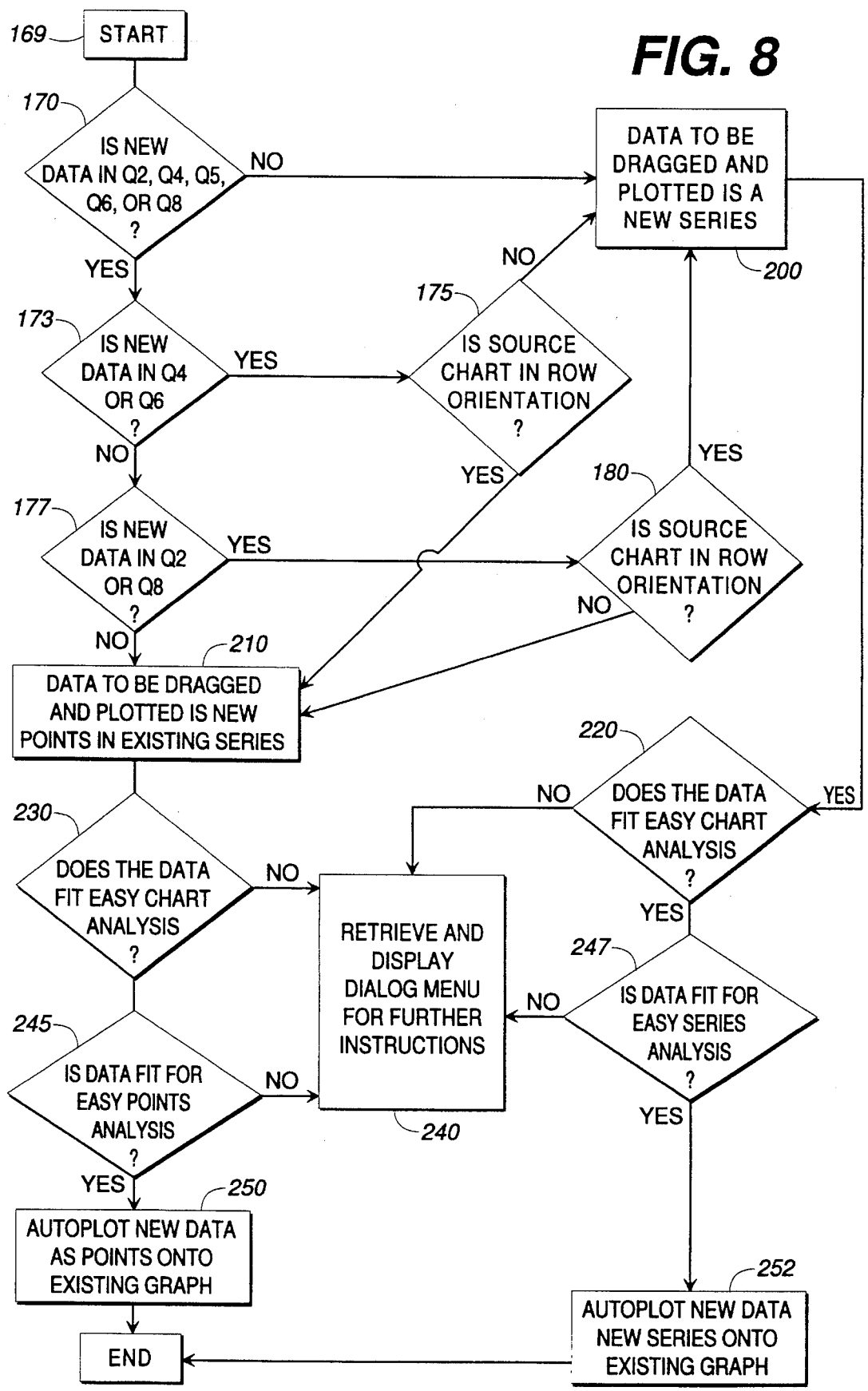
FIG. 8 is a flow chart which sets forth in greater detail the method of the preferred embodiment.

FIG. 8 is a flowchart which further shows the method of the present invention begins at step 169 and proceeds to step 170. Initially, at step 170, it is determined if the data to be dragged is in Q2, Q4, Q5, Q6, or Q8. If the tabularized data to be dragged is not in either Q2, Q4, Q5, Q6, or Q8, then the data is interpreted as a series and the analysis proceeds to step 200 of FIG. 8. If the tabularized data to be dragged is located in either Q2, Q4, Q5, Q6, or Q8, the method of the present invention next determines whether the data is located in Q4 or Q6 (step 173, FIG. 8). If the data to be dragged is in either Q4 or Q6, it is next determined, at step 175, whether the source chart is in row orientation. If the source chart is in row orientation, the data to be dragged is interpreted as new points and the method of the present invention proceeds to step 210. If the source chart is in column orientation and the data to be dragged is in Q4 or Q6, then the data is interpreted as a new series and the method of the present invention proceeds to step 200.

If it is determined that the data to be dragged is in either Q2, Q5, or Q8 (i.e., the "no" branch from step 173), it is determined if the data to be dragged is in Q2 or Q8 (step 177, FIG. 8). If the data is not in Q2 or Q8, then the data is in Q5 and is interpreted as points, thus proceeding to step 210. If the data to be dragged is in Q2 or Q8, the method of the present invention determines whether the source chart is in row orientation (step 180, FIG. 8). If the source chart is in row orientation, the data to be dragged is interpreted as a new series and the analysis proceeds to step 200 of FIG. 8. If the source chart is not in row orientation, the data to be dragged is interpreted as new points and the analysis proceeds to step 210 of FIG. 8.

Thereafter, it is determined if the data to be dragged is properly formatted in steps 220 and 247 for a new series of data and in steps 230 and 245 for new points in a series. If either a new series of data or new points of data to be dragged are not formatted correctly, as described below, then the dialog menu is retrieved to query the user as to how the data should be interpreted (step 240, FIG. 8). If the data is formatted correctly, then the dragged data is integrated into the target chart (steps 250 and 252, FIG. 8).

As part of determining if the data to be dragged is formatted properly, it is determined whether the data fits the criteria for Easy Chart analysis (blocks 220, 230, FIG. 8). In order to meet the Easy Chart criteria, the selected data must all be from the same sheet, must be contiguous and must be of the same orientation. If these formatting criteria are not met, the user is queried on the dialog menu as described above, as to how to interpret the data dragged onto the embedded bar chart (block 240, FIG. 8).

If the Easy chart criteria is met, it is determined whether a series is an Easy Series or if a set of data points are Easy Points (blocks 245, 247, FIG. 8). A series is considered to be an Easy Series if each series of selected data to be dragged starts on the same row or column as the chart data. Data points are considered to be Easy Points if for each row or column of new data, a series exists in that row or column in the chart data. If the series data is an easy series, then the selected data is plotted as a series on the embedded chart (block 252, FIG. 8). Likewise, if the data points are determined to be Easy Points, the selected data points are plotted as points (block 250, FIG. 8). At step 250, if new data points to be added are located in Q5, then they must not intersect existing data points to be plotted. If there are new data points located in Q5 which do intersect existing data points, then the dialog menu is retrieved to query the user as to how to interpret the new data points. If the data does not meet Easy Chart and Easy Points or Easy Series criteria, then the user is queried, via the dialog menu, as to how to interpret the data.

Although the methods and systems of the present invention have been described in terms of the preferred embodiments, it is not intended that the invention be limited to these embodiments. Modifications within the spirit of the invention will be apparent to those skilled in the art. The scope of the present invention is defined by the claims that follow.

We claim:

1. A method for selecting new data contained in a computer's memory and displayed in cells forming a first tabular chart on said computer's display screen and graphically plotting said selected new data onto an existing non-tabular chart created from data displayed in cells forming a second tabular chart, comprising the steps of:

selecting said new data displayed in cells forming said first tabular chart on said computer screen, said selected new data to be incorporated into said existing non-tabular chart;

determining a bounding box quadrant of said second tabular chart, said bounding box encompassing said second tabular chart;

determining the quadrant in which said selected new data is located;

determining whether said bounding box quadrant and said quadrant in which said selected new data is located are the same or adjoining quadrants; and integrating said selected new data into said existing non-tabular chart if said selected new data is in the same or an adjoining quadrant to said bounding box quadrant.

2. The method of claim 1, wherein said integrating step includes determining if said selected new data and said second tabular chart are in row orientation, then said selected new data is charted on said existing non-tabular chart as new points in the same row if said selected new data is located in a horizontal adjoining quadrant to said bounding box quadrant and, alternatively, said selected new data is charted on said existing non-tabular chart in a new series if said selected new data is located in a vertical adjoining quadrant to said bounding box quadrant.

3. The method of claim 1, wherein said integrating step includes prompting the user with queries to determine how to interpret said selected new data if said quadrant in which said selected new data is located is not adjoining said bounding box quadrant.

4. The method of claim 1, wherein said integrating step includes designating said selected new data with a pointer control means on said computer, dragging said selected new data over said existing non-tabular chart, and releasing said pointer control means on said computer.

5. The method of claim 3, wherein said queries in said prompting step are presented to determine the interpretation of said selected new data if said selected new data has a different orientation than said second tabular chart.

6. The method of claim 3, wherein said queries in said prompting step are presented to determine the interpretation of said selected new data if said selected new data or said second tabular chart is discontiguous.

7. The method of claim 3, wherein said queries in said prompting step are presented to determine the interpretation of said selected new data if said selected new data is a series which does not have the same starting row or column as other data on said second tabular chart.

8. The method of claim 1, wherein said integrating step includes determining if said selected new data and said second tabular chart are in column orientation, then said selected new data is charted on said existing non-tabular chart as new points in the same column if said selected new data is located in a vertical adjoining quadrant to said bounding box quadrant and, alternatively, said selected new data is charted on said existing non-tabular chart as a new series if said selected new data is located in a horizontal adjoining quadrant to said bounding box quadrant.

9. The method of claim 1, wherein said integrating step includes determining if said selected new data is at least partially in said bounding box quadrant, is in the same row as data already existing in said second tabular chart, and does not intersect any data already existing in said second tabular chart, then said selected new data is charted on said existing non-tabular chart as new points in an existing series if said selected new data and said second tabular chart are in row orientation.

10. A computer system for graphically rendering a first non-tabular chart from existing data in a first tabular chart and for selecting new data from a second tabular chart, graphically dragging said selected new data from a second tabular chart and incorporating said selected new data into said existing first non-tabular chart, comprising:

a CPU;

a system memory including an operating system for controlling said CPU, an input/output driver and an application program;

a display device coupled to said input/output driver and controlled by said CPU and system memory;

pointer control means coupled to said input/output driver for selectively positioning a pointer on said display device to select said selected new data displayed by said application program on said display device from said second tabular chart to be incorporated into said first non-tabular chart;

means in said application program for identifying the location of said first tabular chart and the location of said second tabular chart; and incorporating said selected new data into said first non-tabular chart based on the relative location of said first tabular chart and said second tabular chart.

11. The apparatus of claim 10, wherein said application program is capable of first determining a bounding box of data originally existing in said first tabular chart, locating a quadrant in which said selected new data is located, and integrating said selected new data into said first non-tabular chart based upon said relative location of the bounding box and said quadrant.

12. The method of claim 1, wherein said integrating step includes determining if said selected new data is at least partially in said bounding box quadrant, is in the same column as data already existing in said second tabular chart, and does not intersect any data already existing in said second tabular chart, then said selected new data is charted on said existing non-tabular chart as new points in an existing series if said selected new data and said second tabular chart are in column orientation.

* * * * *